United States Patent
Oshman (10) Patent No.: US 11,590,555 B2
(45) Date of Patent: Feb. 28, 2023

(54) METHODS OF CREATING BIKE RACK HOOKS

(71) Applicant: Joseph Oshman, Portland, OR (US)

(72) Inventor: Joseph Oshman, Portland, OR (US)

(*) Notice: Subject to any disclaimer, the term of this patent is extended or adjusted under 35 U.S.C. 154(b) by 99 days.

(21) Appl. No.: 17/214,670

(22) Filed: Mar. 26, 2021

(65) Prior Publication Data

US 2022/0126353 A1 Apr. 28, 2022

Related U.S. Application Data

(60) Provisional application No. 63/105,737, filed on Oct. 26, 2020.

(51) Int. Cl.
*B21D 53/36* (2006.01)
*B21D 5/16* (2006.01)
*F16B 45/00* (2006.01)

(52) U.S. Cl.
CPC .......... *B21D 53/36* (2013.01); *B21D 5/16* (2013.01); *F16B 45/005* (2021.05); *F16B 45/015* (2021.05); *Y10T 29/19* (2015.01); *Y10T 29/49789* (2015.01); *Y10T 29/49986* (2015.01); *Y10T 29/49996* (2015.01)

(58) Field of Classification Search
CPC .......... B21D 53/36; B21D 53/86; B21D 5/16; Y10T 29/19; Y10T 29/49789; Y10T 29/49996; Y10T 29/49986; F16B 45/015; F16B 45/005

See application file for complete search history.

(56) References Cited

U.S. PATENT DOCUMENTS

| | | | |
|---|---|---|---|
| 7,031,893 B2* | 4/2006 | Gupta | G05B 19/4097 703/2 |
| 8,027,744 B1 | 9/2011 | Trammell et al. | |
| 8,413,390 B2 | 4/2013 | Pereira | |
| 9,371,102 B1 | 6/2016 | Botkin | |
| 9,703,123 B2 | 7/2017 | Fonte et al. | |
| 2007/0108357 A1 | 5/2007 | Plowman | |
| 2009/0005899 A1 | 1/2009 | Hochenauer et al. | |
| 2014/0053737 A1 | 2/2014 | Simontov et al. | |
| 2015/0073578 A1 | 3/2015 | Anthipagulu et al. | |
| 2015/0375688 A1 | 12/2015 | Peck | |
| 2017/0367792 A1 | 12/2017 | Raby et al. | |
| 2018/0099465 A1 | 4/2018 | Lanciaux | |

* cited by examiner

*Primary Examiner* — Jermie E Cozart
(74) *Attorney, Agent, or Firm* — Mohr Intellectual Property Law Solutions P.C.

(57) ABSTRACT

Methods of creating a hook for a bike rack. The methods include the steps of providing a planar metal material, cutting a two-dimensional shape from the planar metal material where the two-dimensional shape defines a hook precursor, forming the hook precursor into a three-dimensional hook where the three-dimensional hook includes a hook face, and adding a protective layer to the hook face. In some examples, the methods include processing the three dimensional hook to remove sharp edges, cutting a mounting point into the hook precursor, cutting a bevel on an edge of the hook precursor to define a beveled edge, and/or cutting a curve on an edge of the hook precursor to define a rounded edge.

20 Claims, 6 Drawing Sheets

METHODS OF CREATING BIKE RACK HOOKS

CROSS REFERENCE TO RELATED APPLICATIONS

This application claims priority to U.S. Application, Ser. No. 63/105,737, filed on Oct. 26, 2020, which is hereby incorporated by reference for all purposes.

BACKGROUND

The present disclosure relates generally to methods of creating hooks. In particular, methods of creating a hook for a bike rack are described.

Bike racks provide a convenient way to store and transport bicycles. Bike racks are commonly mounted to vehicles and to walls. Some bike racks are configured to support a single bicycle while others are configured to support multiple bicycles.

Known methods for manufacturing bike racks are not fully satisfactory. In particular, existing methods to manufacture hooks for bike racks have certain disadvantages. For example, existing methods are slow and labor intensive. In addition, conventional methods of creating bike rack hooks often require multiple materials and/or specialty materials.

A significant limitation of known methods for manufacturing bike racks is that they do not utilize sheet material. Sheet material is affordable, easy to source, easy to store, and convenient to use. Manufacturing methods that rely on three-dimensional source material shapes, such as rods, blocks, and customized shapes, tend to be more expensive, harder to maintain and store, and more difficult to process.

For example, three-dimensional source material shapes may not be suitable for use in rapid or high-volume manufacturing techniques, such as laser cutting, waterjet cutting, stamping, or die processing. Alternative techniques, like hand forming shapes, bending materials, or extruding materials, tend to be slower, more labor intensive, and more expensive.

Thus, there exists a need for bike rack hook creation methods that improve upon and advance the design of known methods for creating bike rack hooks. Examples of new and useful methods of creating bike rack hooks relevant to the needs existing in the field are discussed below.

Examples of references relevant to the methods discussed below include U.S. Patent References: US20150375688A1; U.S. Pat. No. 9,371,102; US20070108357A1; U.S. Pat. No. 9,703,123B2; US20170367792A1; U.S. Pat. Nos. 8,236,039B2; 8,413,390; US20180099465A1; U.S. Pat. Nos. 7,031,893B2; 8,027,744; US20150073578A1; US20140053737A1; and US20090005899A1. The complete disclosures of the above patents and patent applications are herein incorporated by reference for all purposes.

SUMMARY

The present disclosure is directed to methods of creating a hook for a bike rack. The methods include the steps of providing a planar metal material, cutting a two-dimensional shape from the planar metal material where the two-dimensional shape defines a hook precursor, forming the hook precursor into a three-dimensional hook where the three-dimensional hook includes a hook face, and adding a protective layer to the hook face. In some examples, the methods include processing the three dimensional hook to remove sharp edges, cutting a mounting point into the hook precursor, cutting a bevel on an edge of the hook precursor to define a beveled edge, and/or cutting a curve on an edge of the hook precursor to define a rounded edge.

DETAILED DESCRIPTION

The disclosed methods of creating a hook for a bike rack will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of methods of creating a hook for a bike rack are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Methods of Creating a Hook for a Bike Rack

With reference to the figures, methods of creating a hook for a bike rack will now be described. The methods discussed herein function to produce bike rack hooks.

The reader will appreciate from the figures and description below that the presently disclosed methods address many of the shortcomings of conventional methods of manufacturing bike rack hooks. For example, the methods described below are fast and require less labor than conventional methods. In addition, the presently described methods of creating bike rack hooks do not require multiple materials or specialty materials, but instead utilize sheet material.

Sheet material is affordable, easy to source, easy to store, and convenient to use. By utilizing sheet material, the manufacturing methods described below avoid the drawbacks of three-dimensional source material shapes like rods, blocks, and customized shapes, which tend to be more expensive, harder to maintain and store, and more difficult to process.

The methods discussed below are compatible with rapid and high-volume manufacturing techniques, such as laser cutting, waterjet cutting, stamping, or die processing. Importantly, the novel methods discussed herein avoid the limitations of hand forming materials, bending materials, or extruding materials, which are slow, labor intensive, and expensive.

Method Embodiment One

With reference to FIGS. 1-6, a first example of a method of creating a hook for a bike rack, method 100, will now be described. Method 100 includes the steps of providing a planar metal material at step 101; cutting a two-dimensional shape from the planar metal material at step 102; cutting a mounting point into the hook precursor at step 103; cutting a bevel into the hook precursor at step 104; cutting a curve into the hook precursor at step 105; forming the hook precursor into a three-dimensional hook with a hook face at step 106; removing sharp edges from the three-dimensional hook at step 107; and adding a protective layer to the hook face at step 108.

In some examples, the method does not include one or more steps included in method 100. For example, some manufacturing method examples do not include one or more of cutting a mounting point into the hook precursor; cutting a bevel into the hook precursor; cutting a curve into the hook precursor; removing sharp edges from the three-dimensional hook; and adding a protective layer to the hook face. In other examples, the manufacturing method includes additional or alternative steps.

The reader should understand that the order or steps is not governed by the reference numbers assigned to them in this document. Further, the order of steps may differ in other examples than the order for each step discussed in the examples below.

Providing a Planar Metal Material

Figure 1:
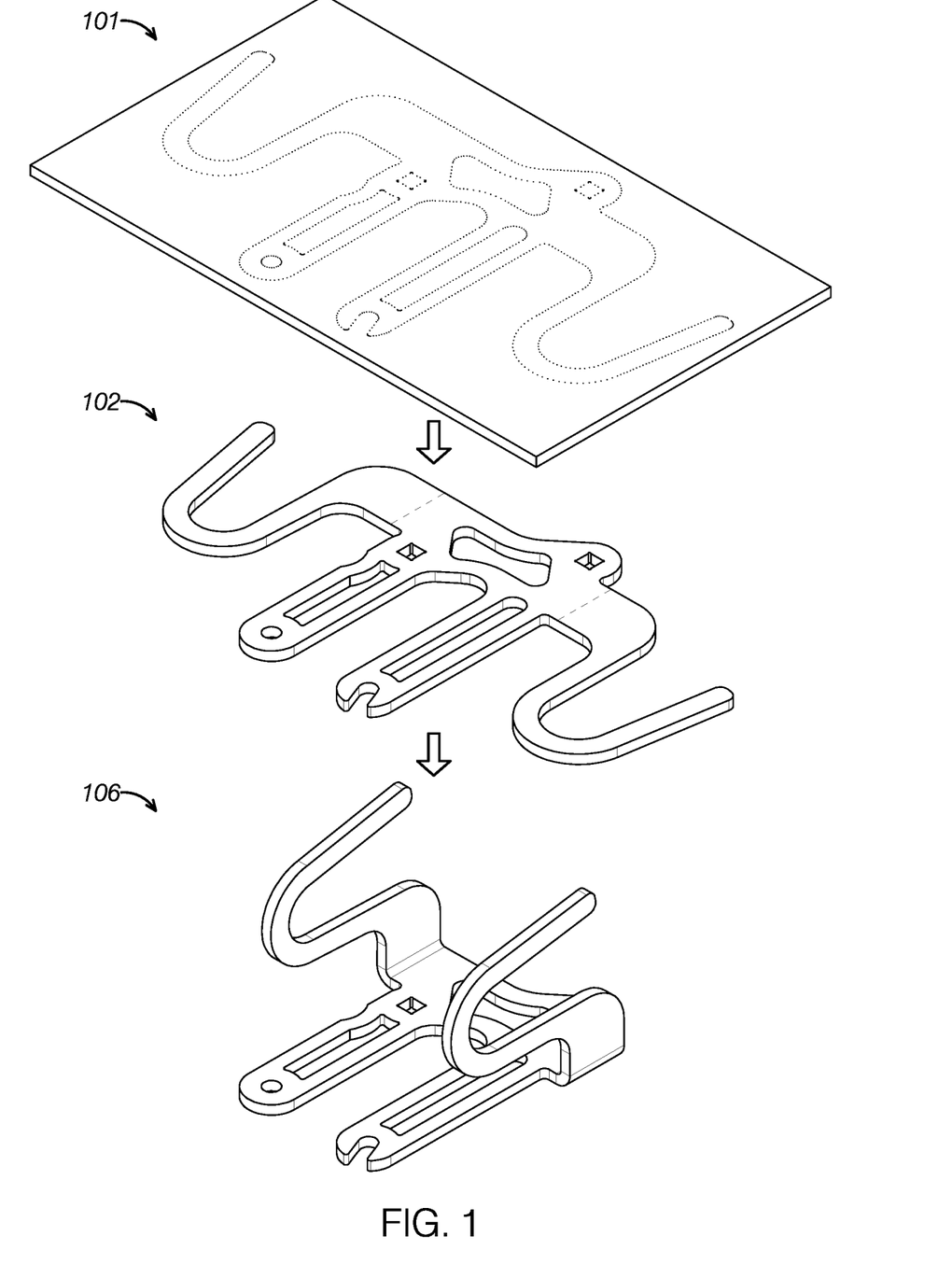
FIG. 1 is a schematic view of a first embodiment of a method of creating a hook for a bike rack.

With reference to FIG. 1, providing a planar metal material at step 101 allows method 100 to create bike rack hooks faster, easier, and more economically than methods that rely on three-dimensional material stock. In preferred embodiments, the entire structure of the bike hook is formed from a single sheet of metal. In other examples, multiple sheets of metal, such as two or more sheets of metals of different compositions, are used. The dimensions of the planar metal material may be selected to suit given production parameters.

The planar metal material may be any currently known or later developed type of sheet metal. A wide range of metals are suitable, including aluminum, brass, copper, steel, tin, nickel, and titanium. In step 101, the planar metal material consists of a single material, namely sheet metal steel. However, in other examples the planar metal material may comprise multiple materials, which is also referred to as being a composite material.

Cutting a Two-Dimensional Shape to Define a Hook Precursor

Cutting a two-dimensional shape from the planar metal material at step 102 functions to form a hook precursor. An example of a two-dimensional hook precursor is depicted in the middle of FIG. 1 with the reference number 102 pointing to it. Of course, different hook examples will entail different hook precursor shapes, sizes, and configurations than the specific hook precursor depicted in FIG. 1.

The reader can see in FIG. 1 that the two-dimensional hook precursor shape corresponds to a flattened form of the three-dimensional hook depicted at the bottom of FIG. 1 with reference number 106 pointing to it. Subsequent processing of the hook precursor, such as in step 106 described below, forms the three-dimensional hook. Other three-dimensional hooks with different shapes, sizes, and configurations may be formed depending on the particular two-dimensional shape cut from the planar metal material.

Figure 5:
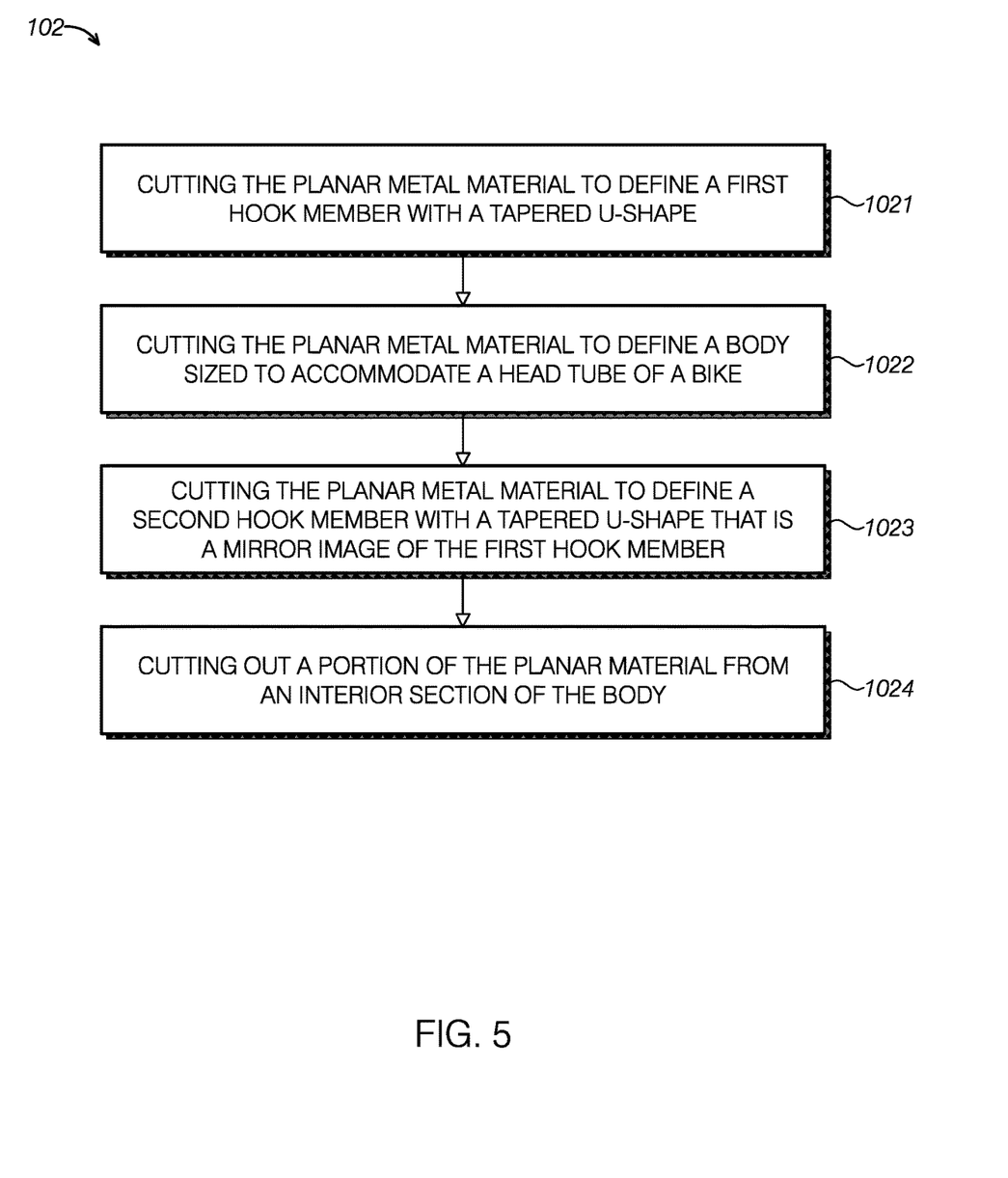
FIG. 5 is a flow diagram depicting a sequence of steps included in one example of cutting a two-dimensional shape.

One example of step 102 is depicted in FIG. 5. In the FIG. 5 example, cutting a two-dimensional shape from the planar metal material at step 102 includes cutting the planar metal material to define a first hook member at step 1021. This example of step 102 further includes cutting the planar metal material to define a body at step 1022. The example of step 102 depicted in FIG. 5 also includes cutting the planar metal material to define a second hook member at step 1023 and cutting out a portion of the planar material from an interior section of the body at step 1024.

As shown in FIG. 1, the upper geometry of the hook may be different from the bottom geometry to make receiving, releasing, and supporting handlebars easier and more effective. In the example shown in FIG. 1, the upper portion of the three-dimensional hook is flared out relative to the bottom portion of the hook to closely support a handlebar from the front, back, and below when the handlebar is seated in the hook. The flared configuration also facilitates moving the handlebar into and out of the hook.

To achieve these support and movement features, the planar metal material is cut so that the first hook member has a tapered U-shape in step 1021 shown in FIG. 5. Likewise, the planar metal material is cut so that the second hook member has a tapered U-shape in step 1023. As shown in FIG. 1, the tapered U-shape defined by each of the first hook member and the second hook member is selected to complement a handlebar of a bicycle.

In the example depicted in FIG. 5, step 102 includes cutting the first hook member and the second hook member to be mirror images of each other. However, in other examples the planar metal materials cut to form a hook precursor where the first hook member and the second hook member are not mirror images of each other.

In step 1022, the body is cut from the planar metal material such that it is integrally coupled to the first hook member at a first fold line boundary. In the example depicted in FIG. 5, the body is sized to accommodate the head tube of a bike. With the body size selected to accommodate the head tube of a bike, the three-dimensional hook formed in step 106 will have the first and second hook members spaced a distance sufficient for the head tube to extend between them adjacent to the body as the handlebar is supported by the first and second hook members from opposite sides of the head tube.

In step 1023, the second hook member is cut from the planar metal material such that the second hook member is integrally coupled to the body. In particular, the second hook member is disposed opposite the first hook member at a second fold line boundary between the second hook member and the body.

In step 1024, cutting out a portion of the planar material from an interior section of the body functions to reduce the weight of the hook precursor. Cutting out portions of the body may serve aesthetic or other functions as well, such as providing mounting points. However, cutting out a portion of the planar material from an interior section of the body is an optional step not undertaken in all examples. In some examples, portions of the first hook member or the second hook member are cut out in addition to or instead of cutting out portions of the body.

Figure 3:
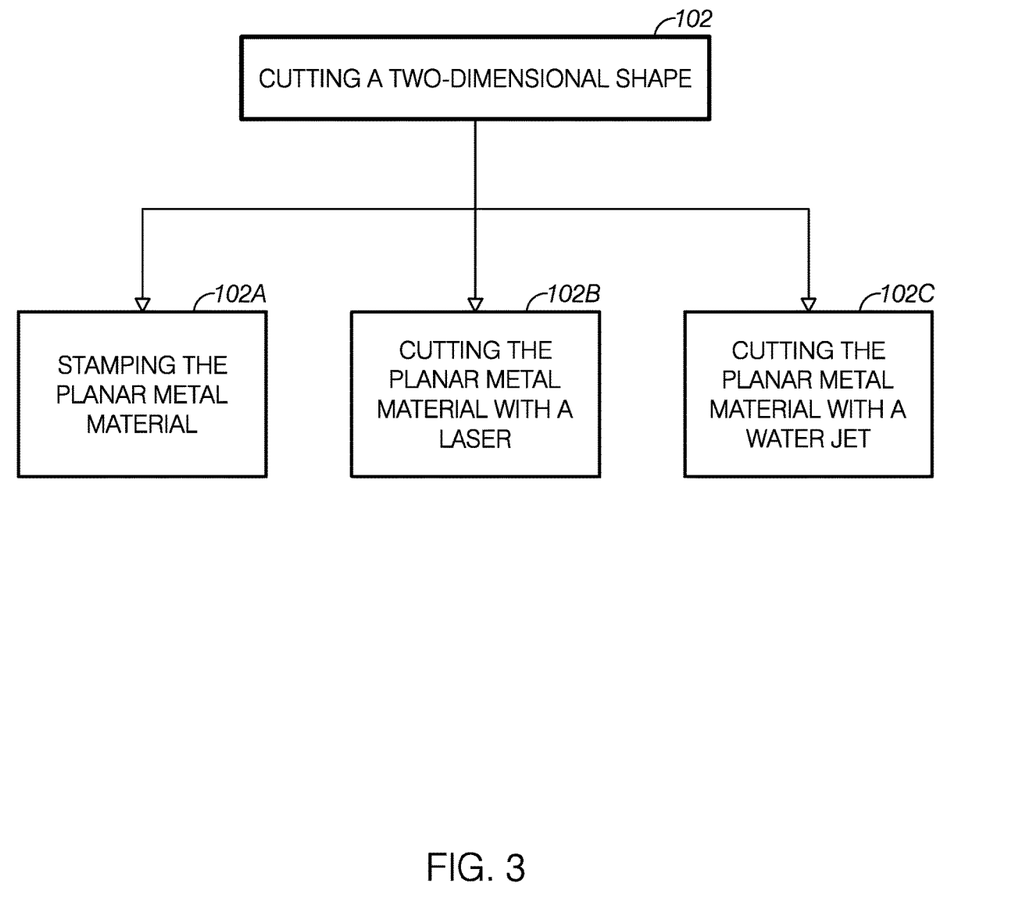
FIG. 3 is a flow diagram depicting alternative steps for cutting a two-dimensional shape.

With reference to FIG. 3, the reader can see that cutting a two-dimensional shape from the planar metal material at step 102 may be accomplished in a variety of different ways. For example, step 102 may be accomplished by stamping the planar metal material at step 102A, cutting the planar metal material with a laser at step 102B, or cutting the planar metal material with a water jet at step 102C. Another example of cutting a two-dimensional shape not depicted in FIG. 3 is die processing. Step 102 may be accomplished by any conventional or later developed means for cutting shapes from sheet metal.

CNC machines may be utilized to automate cutting or the cutting tools may be controlled manually. In some examples, the planar metal material is stamped in a manner that both cuts the shape and bevels or rounds the edges of the shape at the same time.

Cutting a Mounting Point into the Hook Precursor

By comparing the planar sheet and the hook precursor in FIG. 1, the reader can see that various defined features may be cut out of the planar material when forming the hook precursor. For example, openings, channels, and mounting points for passing straps, bolts, or fasteners through the bike rack hook and/or to reduce weight or material usage may be cut out of the hook precursor.

Figure 2:
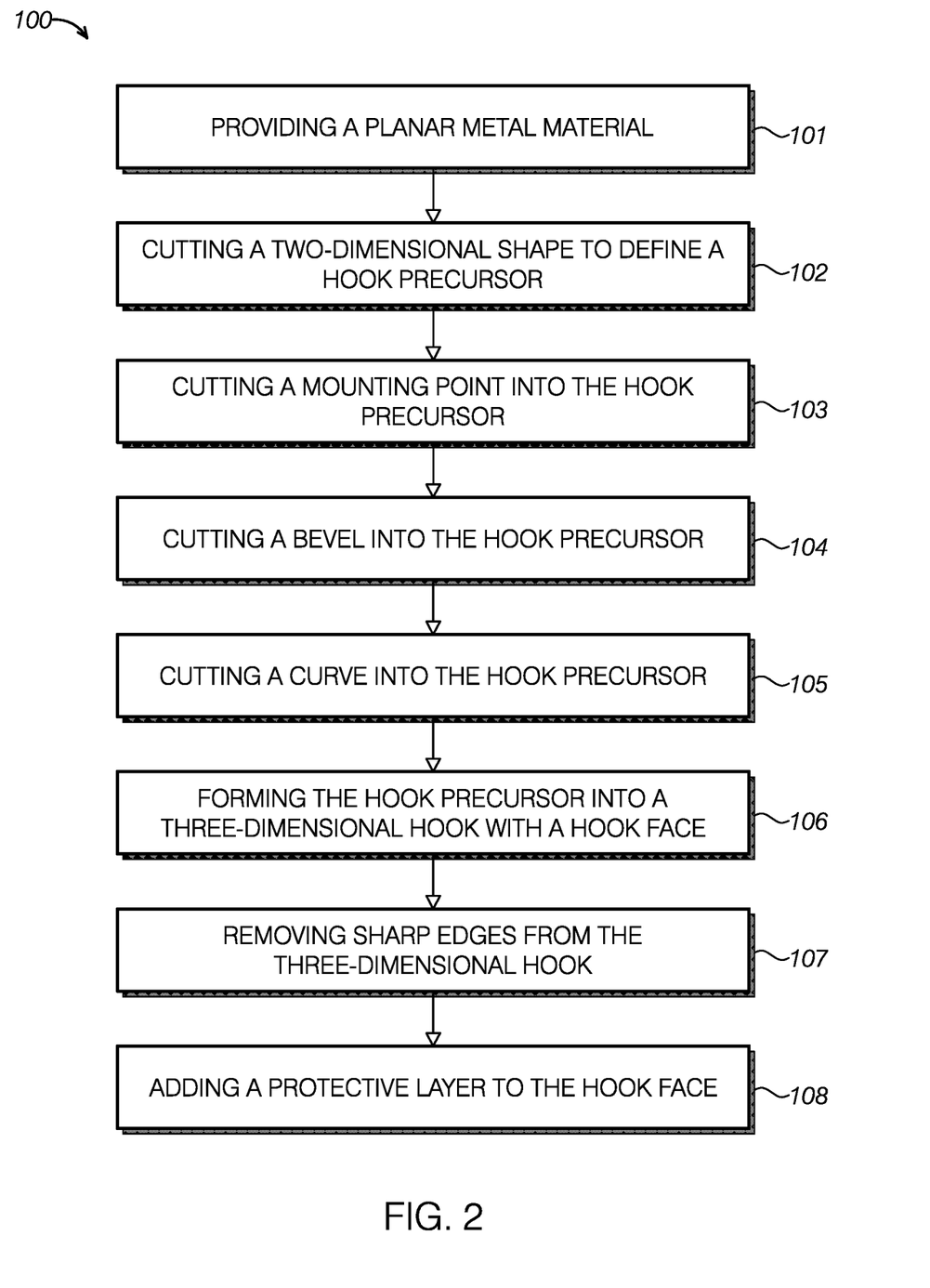
FIG. 2 is a flow diagram of the method of creating a hook shown in FIG. 1.

As shown in FIG. 2, a mounting point is cut into the hook precursor at step 103. The mounting point may enable safety hold down straps, cords, or other elongate tension bearing members to be secured around a handlebar supported by the three-dimensional hook.

The mounting points may be configured in a variety of shapes and sizes. For example, as depicted in FIG. 1, the mounting point may be round or an open notch channel. Other shapes, such as triangular, square, rectangular, oval, a regular polygon, or an irregular shape are envisioned.

Cutting a Bevel into the Hook Precursor

At step 104 depicted in FIG. 2, cutting a bevel on an edge of the hook precursor defines a beveled edge. Cutting a bevel to form a beveled edge at step 104 may enable the bike rack hook to function more effectively, such as to form inclined surfaces to help guide a handlebar or a strap into a desired position. Additionally or alternatively, cutting a bevel to form a beveled edge at step 104 may contribute to the aesthetics of the bike rack hook.

Cutting a Curve into the Hook Precursor

At step 105 depicted in FIG. 2, cutting a curve on an edge of the hook precursor defines a rounded edge. Cutting a curve to form a rounded edge at step 105 may enable the bike rack hook to function more effectively, such as to reduce friction to help a handlebar or a strap slide over the rounded edge of the three-dimensional hook into a desired position. Forming rounded edges may increase the safety of the three-dimensional hook by removing a sharp edge that could scrape or cut a person's skin or damage a bike. Additionally or alternatively, cutting a curve to form a rounded edge at step 105 may contribute to the aesthetics of the bike rack hook.

Forming the Two-Dimensional Shape into a Three-Dimensional Shape

Forming the hook precursor into a three-dimensional shape at step 106 converts the hook precursor into a functional hook. In the example shown in FIG. 1, the three-dimensional hook is a bike rack hook configured as a double hook. However, the bike rack hook may be configured as a single hook or include more than two hooks.

In one particular example of step 106, the resulting three-dimensional hook includes a first hook member, a body, and a second hook member. The first hook member, the body, and the second hook member correspond to first hook member, the body, and the second hook member formed by cutting the planar metal material in step 102. The body is integrally coupled to the first hook member at a first fold line boundary. The second hook member is integrally coupled to the body opposite the first hook member at a second fold line boundary The reader can see in FIG. 1 that the three-dimensional shape formed in step 103 corresponds to a hook with hook faces. The hook faces serve as bearing surfaces engaging the handlebar or fork of a bike to retain the bike in position.

Forming the two-dimensional shape into a three-dimensional shape at step 103 may be accomplished by any conventional or later developed means for bending and shaping metal, including sheet metal. The metal forming operations may be accomplished with automated or manual techniques.

Figure 6:
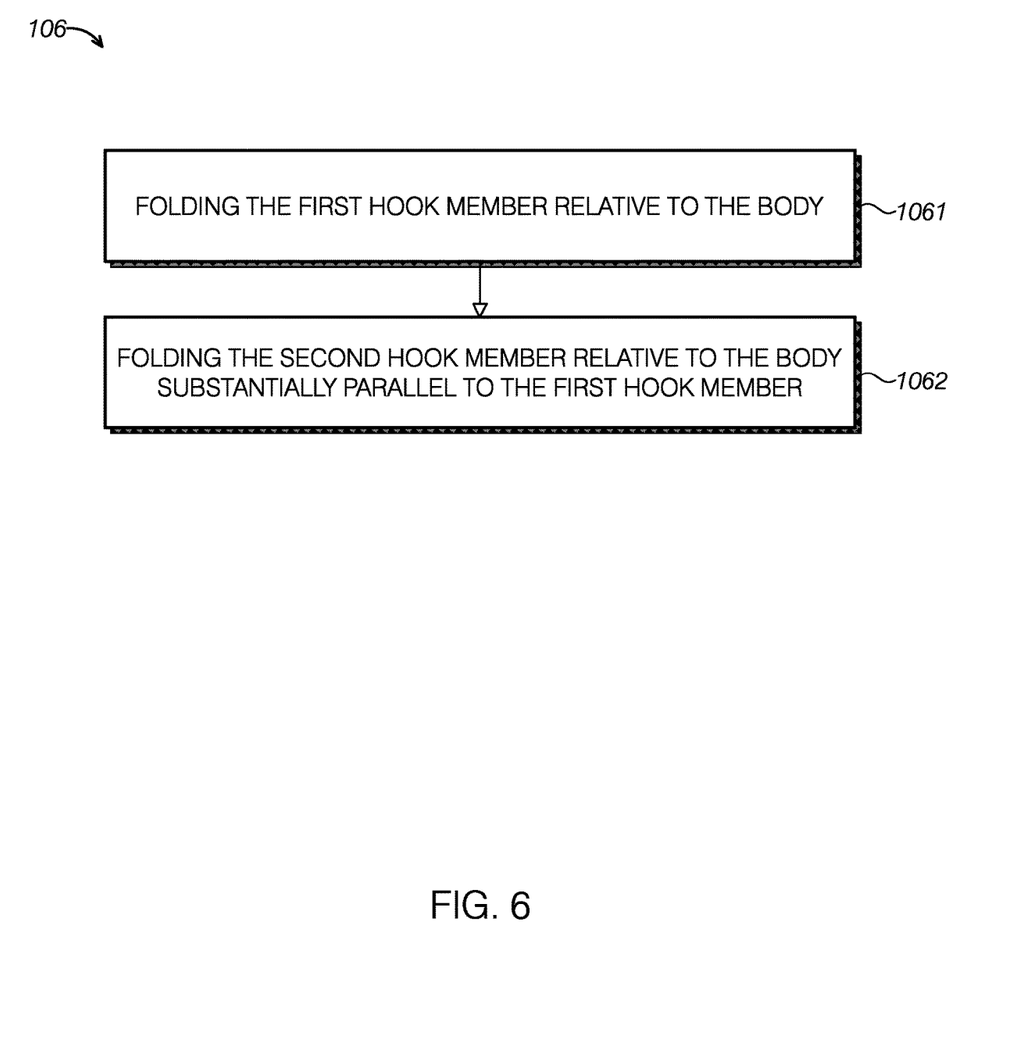
FIG. 6 is a flow diagram depicting a sequence of steps included in one example of forming a hook precursor into a three-dimensional hook.

One example of steps used to form the hook precursor into a three-dimensional shape at step 106 is shown in FIG. 6. As shown in FIG. 6, forming the hook precursor into a three-dimensional shape at step 106 may include folding the first hook member relative to the body at step 1061. In the example shown in FIG. 6, the first hook member is folded relative to the body at a first fold line boundary.

At step 1062 in FIG. 6, the second hook member is folded relative to the body. In particular, the second hook member is folded relative to the body at a second fold line boundary. In the example shown in FIG. 6, the second hook member is folded relative to the body at step 1062 such at the second hook member is substantially parallel to the first hook member. In other examples, the second hook member is folded relative to the body in a position that is not substantially parallel to the first hook member.

Removing Sharp Edges

Optionally, sharp edges may be removed at step 107. Step 107 may be performed on the nook precursor after cutting the two-dimensional shape at step 102 and/or on the three-dimensional hook after forming the three-dimensional hook at step 106. Removing sharp edges at step 107 may increase the safety of the three-dimensional hook by reducing the chance that contacting the three-dimensional hook will scrape or cut a person's skin or damage a bike. Sharp edges may be removed by any conventional means, such as sanding or polishing.

Adding a Protective Layer

Figure 4:
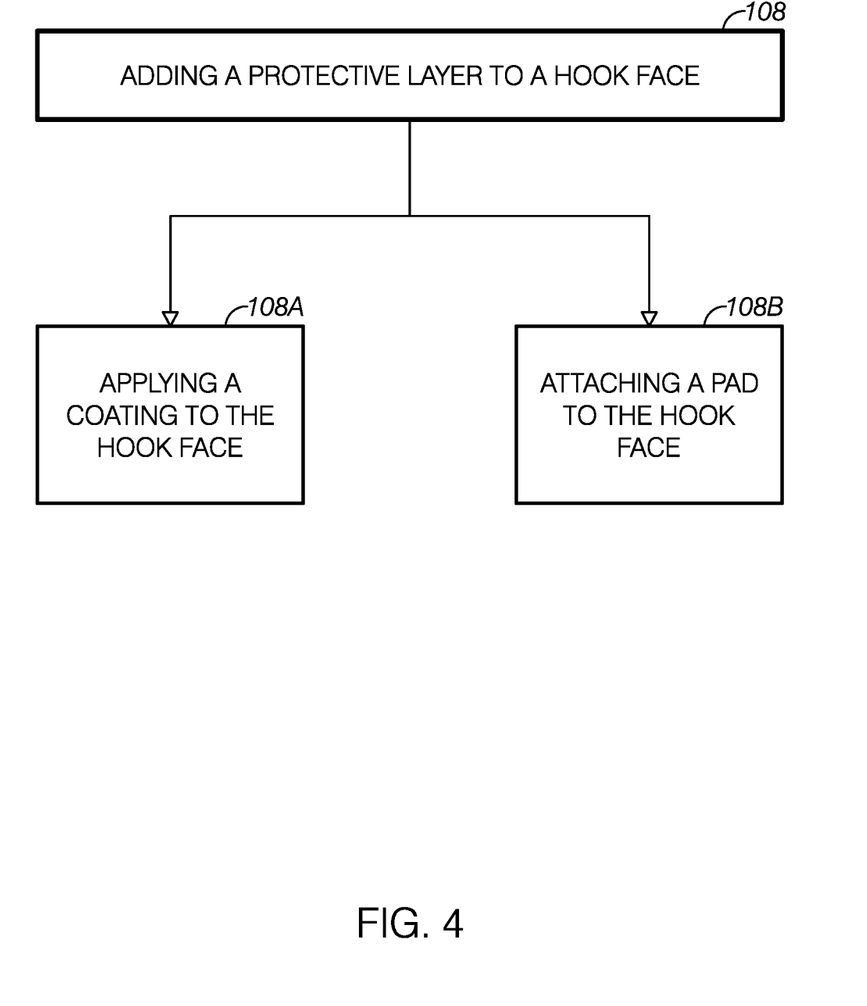
FIG. 4 is a flow diagram depicting alternative steps for adding a protective layer to a hook face.

Adding a protective layer to the hook face at step 108 functions to accommodate wear and tear that is likely to occur from inserting and removing the handlebar of a bike from the hook and from supporting the handlebar with the hook. However, adding a protective layer is optional and not all examples of forming a bike rack include a step of adding a protective layer to the face of the hook. As shown in FIG. 4, adding a protective layer to the hook face at step 108 may be accomplished in a variety of ways.

For example, as shown at step 108A, a protective layer may be added by applying a protective coating to the hook face. Additionally or alternatively, as shown at step 108B, adding a protective layer to the hook face may involve attaching a pad to the hook face. The coatings or pads may be any conventional or later developed materials with protective properties suitable for use in a bike rack.

In examples where a pad is applied to the hook faces, the pad may be attached to the hook face by any suitable means. Suitable means include adhering the pad to the face, fastening the pad to the face with a fastener, such as a mechanical fastener or a hook-and-loop fastener, magnetically coupling the pad to the face, or welding the pad to the face.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or a related application. Such amended or new claims, whether they are directed to the same invention or a different invention and whether they are different, broader, narrower or equal in scope to the original claims, are to be considered within the subject matter of the inventions described herein.

The invention claimed is:

1. A method of creating a hook for a bike rack comprising the steps of:
   providing a planar metal material;
   cutting a two-dimensional shape from the planar metal material where the two-dimensional shape defines a hook precursor;
   and cutting a mounting point into the hook precursor;
   where the mounting point is adapted to receiving an elongate tension bearing member;
   forming the hook precursor into a three-dimensional hook where the three-dimensional hook includes a hook face; and
   adding a protective layer to the hook face.

2. The method of claim 1, wherein adding a protective layer to the hook face includes applying a coating to the hook face.

3. The method of claim 1, wherein adding a protective layer to the hook face includes attaching a pad to the hook face.

4. The method of claim 1, wherein providing a planar metal material includes providing a sheet metal.

5. The method of claim 4, wherein the sheet metal is comprised of steel.

6. The method of claim 1, wherein the planar metal material consists of a single material.

7. The method of claim 6, wherein the single material is steel.

8. The method of claim 1, wherein cutting a two-dimensional shape from the planar metal material includes stamping the planar metal material.

9. The method of claim 1, wherein cutting a two-dimensional shape from the planar metal material includes cutting the planar metal material with a laser.

10. The method of claim 1, wherein cutting a two-dimensional shape from the planar metal material includes cutting the planar metal material with a water jet.

11. The method of claim 1, further comprising processing the three dimensional hook to remove sharp edges.

12. The method of claim 1, where the mounting point is cut into the hook precursor, in the shape a slot to receive the elongate tension bearing member.

13. The method of claim 1, further comprising cutting a bevel on an edge of the hook precursor to define a beveled edge.

14. The method of claim 1, further comprising cutting a curve on an edge of the hook precursor to define a rounded edge.

15. The method of claim 1, wherein cutting a two-dimensional shape from the planar metal material includes:
   cutting the planar metal material to define a first hook member;
   cutting the planar metal material to define a body integrally coupled to the first hook member at a first fold line boundary; and
   cutting the planar metal material to define a second hook member integrally coupled to the body opposite the first hook member at a second fold line boundary.

16. The method of claim 15, wherein cutting the planar metal material to define a first hook member and cutting the planar metal material to define a second hook member includes cutting the first hook member and the second hook member to be mirror images of each other.

17. The method of claim 15, further comprising cutting out a portion of the planar material from an interior section of the body to reduce weight of the hook precursor.

18. The method of claim 15, wherein:
cutting the planar metal material to define a first hook member includes cutting the first hook member to define a tapered U-shape; and
cutting the planar metal material to define a second hook member includes cutting the second hook member to define the tapered U-shape.

19. The method of claim 18, wherein the tapered U-shape defined by each of the first hook member and the second hook member is selected to complement a handlebar of a bicycle.

20. The method of claim 19, wherein:
forming the hook precursor into a three-dimensional hook incudes:
   folding the first hook member relative to the body at the first fold line boundary;
   folding the second hook member relative to the body at the second fold line boundary such that the second hook member is substantially parallel to the first hook member;
cutting the planar metal material to define a body includes cutting the body to a size selected to space the first fold line boundary from the second fold line boundary a distance sufficient to accommodate a head tube of a bicycle as the first hook member and the second hook member support the handlebar of the bicycle from opposite sides of the head tube.

\* \* \* \* \*